No. 653,826. Patented July 17, 1900.
J. H. SOULE & N. F. GEECK.
TRUCK.
(Application filed Dec. 18, 1899.)
(No Model.)
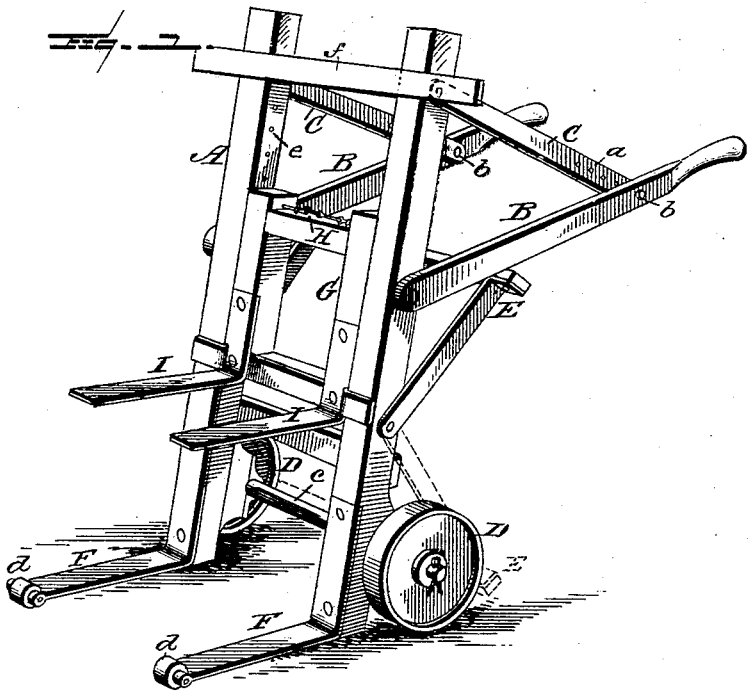
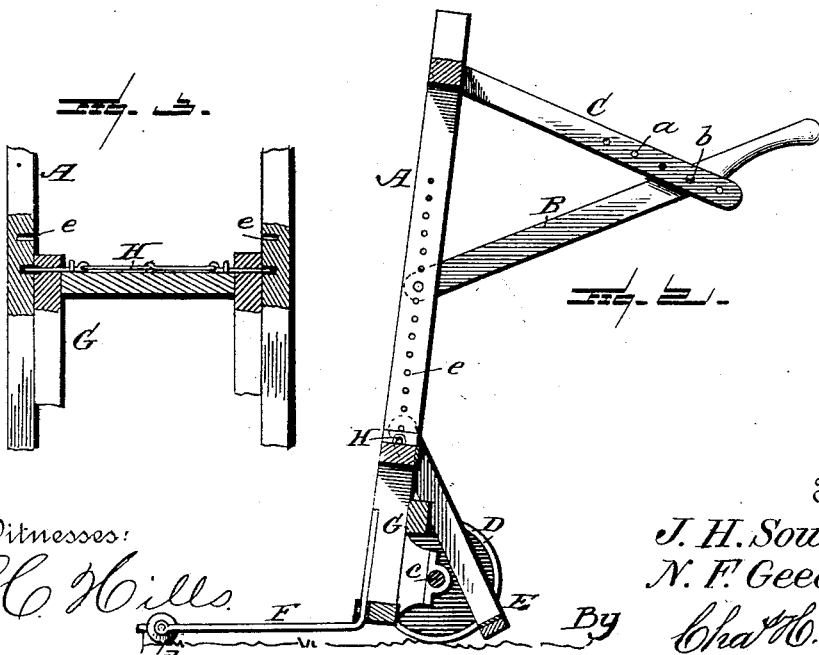
Witnesses:
L. C. Hills
F. C. Barry
Inventors
J. H. Soule
N. F. Geeck
By Chas. H. Fowler.
Attorney

UNITED STATES PATENT OFFICE.

JONATHAN H. SOULE AND NICHOLAS F. GEECK, OF OWOSSO, MICHIGAN.

TRUCK.

SPECIFICATION forming part of Letters Patent No. 653,826, dated July 17, 1900.

Application filed December 18, 1899. Serial No. 740,745. (No model.)

*To all whom it may concern:*

Be it known that we, JONATHAN H. SOULE and NICHOLAS F. GEECK, citizens of the United States, residing at Owosso, in the county of Shiawassee and State of Michigan, have invented certain new and useful Improvements in Trucks; and we do hereby declare that the following is a full, clear, and exact description of the same, reference being had to the annexed drawings, making a part of this specification, and to the letters of reference marked thereon.

The present invention has for its object to provide a hand-truck adapted for the handling and moving of screen-doors and other like objects that require more than ordinary care to prevent injury thereto, such truck being simple in construction and both strong and durable in its several parts and easily and conveniently operated.

The invention consists in a hand-truck constructed substantially as shown in the drawings and hereinafter described and claimed.

Figure 1 of the drawings is a perspective view of the complete truck constructed in accordance with our invention; Fig. 2, a vertical central section; Fig. 3, a detail view, partly in section, showing the double latch device.

In the accompanying drawings, A represents the frame of the truck, preferably of rectangular shape and provided upon its outer sides with pivoted handle-bars B. These handle-bars are pivoted for the purpose of rendering them adjustable and are held in their adjusted position by means of the pivoted braces C, said braces having a plurality of holes $a$, with which engages a pin $b$ to secure the handles to the braces. This adjustment of the handle-bars adapts the truck for objects that are long and heavy, as by raising to more of an acute angle with the frame of the truck the load may be brought over the wheels without the person stooping too low.

The truck-wheels D are connected to the axle $c$ in the usual manner and the axle connected to the under side of the frame A.

A pivoted brake E of any preferred construction is connected to the sides of the truck-frame, and when in operative position is against the periphery of the wheels, as shown in dotted lines in Fig. 1 of the drawings and in full lines in Fig. 2 of the drawings. This brake may be of any suitable construction either to act on the wheels below or above the center thereof, as found most desirable, which will prevent the wheels from moving backward when the truck is being loaded.

The lower end of the truck-frame A, or the end to which the truck-wheels are connected, is provided with lever-arms F, which arms extend outward at substantially right angles to said frame and are provided with rollers $d$ at their extremities.

A supplemental frame G is adapted to slide in the frame A and is held in its adjusted position by means of a suitable latch device H of any preferred construction, the bolts of said device engaging with one of a plurality of holes $e$ on the sides of the truck-frame. This adjustable and supplemental frame G is provided with lever-arms I, substantially at right angles to said frame and parallel with the arms $f$. This supplemental frame G is not only adjustable, but also removable, so that it may be taken out of the frame A to render the truck as light as possible when moving doors or other like heavy objects. When the supplemental frame is in use, the arms I are brought under the object, such as tables and the like, the supplemental frame being adjusted and held in its adjusted position to adapt the height of the arms to the object to be loaded on the truck. When these arms I are not required for use, as above described, the supplemental frame may be either removed from the truck or said arms may be brought down parallel with the arms F, as shown in Fig. 2 of the drawings.

This truck possesses many advantages not attained by the trucks of ordinary construction in that it is adapted for handling and loading screen-doors after they have been completed without in the slightest manner indenting, breaking, or pulling the wire-cloth from its fastenings or otherwise injuring the screen, the lever-arms, with their rollers, the adjustable handle-bars, and the pivoted brake rendering the truck especially adapted to the purpose, as well as for articles of furniture requiring care in handling. The supplemental slidable frame, with its lever-arms, is also of material importance in handling furniture or other objects having legs raised from the ground or objects having supports of any kind which the lever-arms on the truck-frame would not be convenient to use.

The truck-frame, as well as the supplemental slidable frame, may be of any suitable construction, and any well-known or convenient means may be employed for holding the supplemental frame in its adjusted position in place of the latch device shown. The handle-bars may also be of any suitable construction and rendered adjustable and held in their adjusted position in any convenient manner found best adapted to the purpose, and any brake device may be used in place of that shown, any changes or modifications in the several details of construction above suggested being made without departing from the principle of the invention or the essential features thereof.

If desired, the handle-bars may be either adjustable or stationary and the cross-bar $f$ of the truck-frame of sufficient length to extend beyond the sides of the truck-frame, as shown in Fig. 1 of the drawings, in order to support wide screen-doors without injury to the wire.

Having now fully described our invention, what we claim as new, and desire to secure by Letters Patent, is—

1. A truck consisting of a main frame and a slidable and adjustable supplemental frame, lever-arms extending substantially at right angles to the frames and connected to each frame at the outer ends thereof, and a cross-bar upon the main frame extending laterally beyond the sides thereof to form a support, substantially as and for the purpose set forth.

2. A truck consisting of a suitable frame, lever-arms provided with rollers upon the end of the frame, and suitable handles for lifting the truck-frame, substantially as and for the purpose described.

3. A truck consisting of a suitable frame, a supplemental frame removably and adjustably connected to the truck-frame, and lever-arms upon the ends of the two frames, and adjustable handle-bars connected to the truck-frame, substantially as and for the purpose set forth.

4. A truck consisting of a suitable frame having a cross-bar connected thereto and projecting beyond the sides of the frame, a supplemental frame adjustable on the truck-frame, lever-arms upon the ends of the two frames, and a suitable brake to act upon the truck-wheels, substantially as and for the purpose specified.

In testimony that we claim the above we have hereunto subscribed our names in the presence of two witnesses.

JONATHAN H. SOULE.
NICHOLAS F. GEECK.

Witnesses:
GEO. P. SACKRIDER,
GEO. A. NEEDHAM.